United States Patent
Fujii

(10) Patent No.: US 6,227,749 B1
(45) Date of Patent: *May 8, 2001

(54) SWIVEL BASE ASSEMBLY FOR CONNECTING INSULATOR TO SUPPORT STRUCTURE

(75) Inventor: Shuji Fujii, Virginia Beach, VA (US)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,502

(22) Filed: Jun. 8, 1998

(51) Int. Cl.[7] ........................................ F16C 11/04
(52) U.S. Cl. ........................ 403/78; 403/152; 403/154; 174/43; 174/45 R
(58) Field of Search .................. 403/78, 79, 150, 403/152, 157, 154, 163; 174/43, 45 R, 145, 158 R, 163 R; D8/364

(56) References Cited

U.S. PATENT DOCUMENTS

| | | | |
|---|---|---|---|
| 1,396,324 | * 11/1921 | Gieseke | 403/79 X |
| 1,409,954 | * 3/1922 | Johnston | 403/150 X |
| 2,551,136 | * 5/1951 | Keltner | 403/78 X |
| 3,296,358 | * 1/1967 | Fiero et al. | 174/43 |
| 3,342,925 | * 9/1967 | Lewis et al. | 174/45 R |
| 3,538,237 | * 11/1970 | Hockaday | 174/43 |
| 3,596,947 | * 8/1971 | Ishihara | 403/154 X |
| 3,850,533 | * 11/1974 | Thielen | 403/157 X |
| 4,711,461 | 12/1987 | Fromberg . | |
| 5,036,162 | * 7/1991 | Zajfert | 174/43 |

FOREIGN PATENT DOCUMENTS 2 099 547   12/1982  (GB) .

OTHER PUBLICATIONS

SU 525–167 (Insulator Fittings), Nov. 12,1976, Basic Electric Elements, p. 4, *abstract*.
Lapp Catalog, Section 155, Hinge Assembly, Feb. 1993.
Ohio Brass Catalog, Optional Pivoting Strut Member, Apr. 1997.
Sediver Application Guide, Composite Line Posts for Transmission Lines, Mar. 1990.

* cited by examiner

Primary Examiner—Lynne H. Browne
Assistant Examiner—David E. Bochna
(74) Attorney, Agent, or Firm—Burr & Brown

(57) ABSTRACT

A swivel base assembly for mounting an insulator to a support structure, including a base member having a pair of opposed bearing seats spaced apart from one another in alignment along a bearing axis, and a one-piece coupling member having a first end received within the pair of opposed bearing seats and a second end adapted to be coupled to the insulator. The first end defines a first pivot axis for the insulator and the second end defines a second pivot axis for the insulator, wherein the first pivot axis is substantially coincident with the bearing axis and the second pivot axis is substantially perpendicular to the first pivot axis. The assembly also includes a mechanism for securing the base member to the support structure.

20 Claims, 2 Drawing Sheets

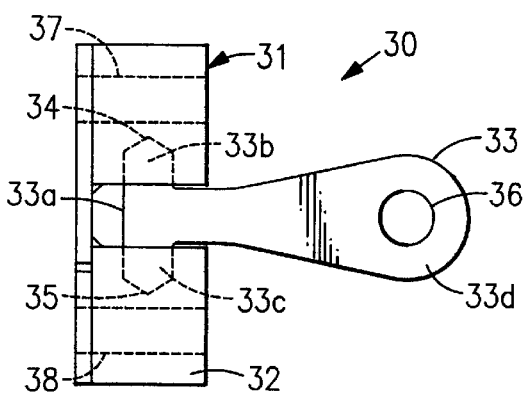
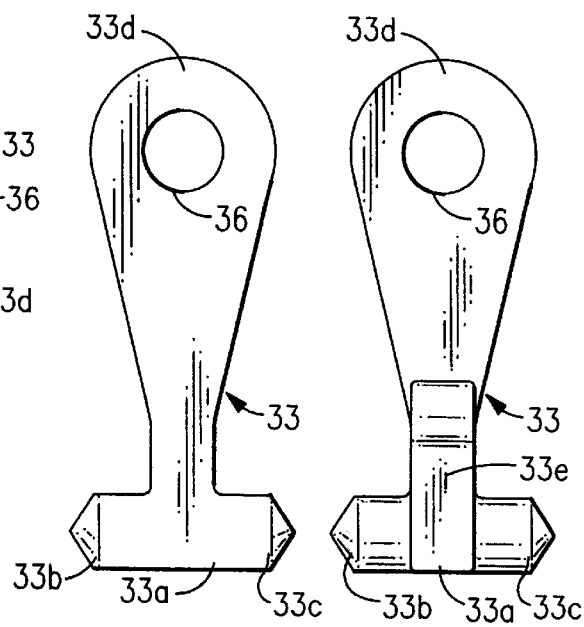
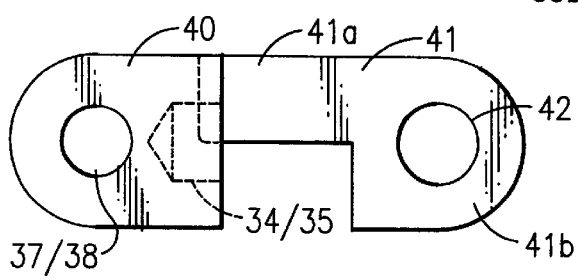
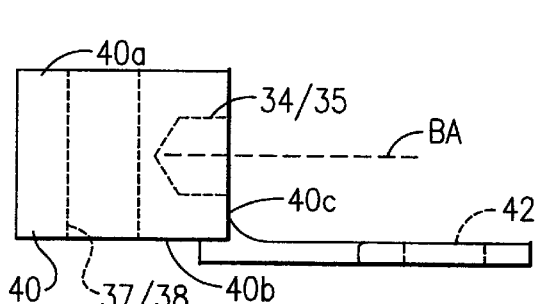
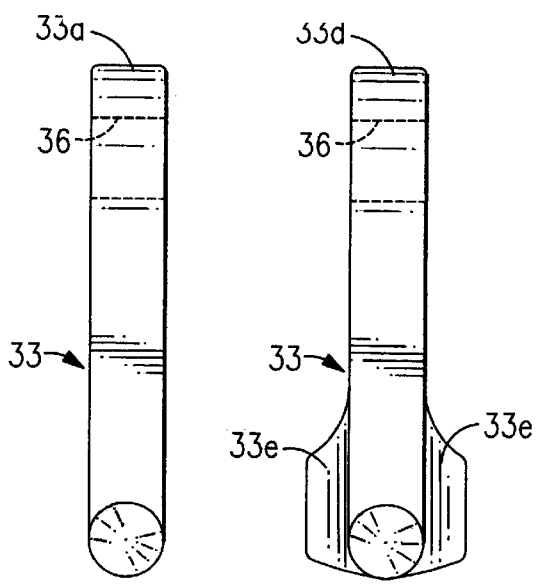
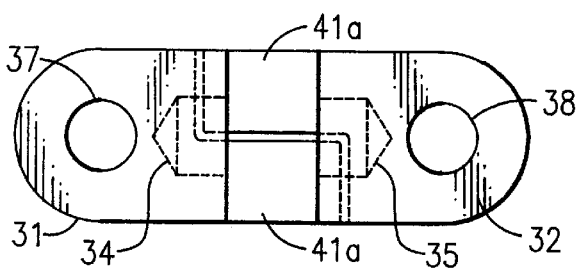

SWIVEL BASE ASSEMBLY FOR CONNECTING INSULATOR TO SUPPORT STRUCTURE

FIELD OF THE INVENTION

The present invention relates to a swivel base assembly for connecting an insulator to a support structure, and in particular, a swivel base assembly for connecting a strut insulator of a "horizontal-V" to a vertical support structure.

BACKGROUND OF THE INVENTION

Power transmission lines are used to transmit power from power generation plants to substations and other power consumption facilities. The power transmission lines are suspended from towers or poles using several types of well-known installations. The horizontal-V is one of those well-known installations. As shown in FIG. 1, a strut insulator (1) extends horizontally from a utility pole (2) and a stay insulator (3) extends at an angle from a point on utility pole (2) above the point where strut insulator (1) is connected to pole (2). The two insulators are joined together at their distal ends, and a conductor (4) is suspended from the joined distal ends. The appearance of the strut and stay insulators mounted on the pole is what gave rise to the horizontal-V name.

The weight of the conductor (4) and other hardware (e.g., anchor shackle, suspension clamp, link, armor rod, and the like) results in stay insulator (3) being in tension and strut insulator (1) being in compression. As such, different insulator structures are usually employed for the stay and strut insulators; the former must withstand tensile forces, and the latter must withstand compressive forces.

It is necessary to mount the insulators on the pole in a manner that will allow the fixed ends of the insulator to pivot in the event of line movement. For example, a wind gust may cause the transmission line to move vertically (up and down in the plane of FIG. 1) as well as longitudinally (in and out of the plane of FIG. 1). It is preferred that the mounting structures used to connect the insulators to the pole pivot at the fixed ends of the insulators in order to relieve any impact shock in the insulator due to movement of the conductor. Otherwise, extreme movement of the conductor could result in damage to the insulators.

It is relatively easy to connect the stay insulator to the pole since that insulator is subjected mainly to tensile forces. One connection method uses an anchor shackle (5) connected to the tower or an extension thereof. The anchor shackle is connected to a similarly configured metal fitting (6) on the stay insulator. This arrangement allows adequate vertical and longitudinal pivoting at the fixed, tower end of the stay insulator.

The strut insulator presents unique mounting problems, however, due to the compressive forces imposed by the weight of the conductor and associated hardware. Various types of mounting assemblies (7) have been used to connect the strut insulator to the pole. FIGS. 2a and 2b show top and side views, respectively, of one example of such a mounting assembly.

The mounting assembly shown in FIGS. 2a and 2b includes a base (20) that is secured directly to a utility pole (2) by fastening bolts (B) through holes (21) passing through the vertical leg (22) of base (20). A coupling plate (23) is pivotally mounted on base (20) via a vertical oriented bolt (24) extending through holes (25) and (26) passing through horizontal legs (27) and (28) of base (20). The bolt (24) defines an axis about which the strut insulator can pivot in the longitudinal direction (in and out of the plane of FIG. 2b). A bolt (29) passes through the clevis fitting (30) of the strut insulator, and through coupling plate (23) to connect the strut insulator to the mounting assembly. Bolt (29) defines an axis about which the strut insulator can pivot in the vertical direction (up and down in the plane of FIG. 2b).

While this mounting assembly provides the necessary longitudinal and vertical pivot axes for the strut insulator, it provides insufficient space between base (20) and coupling plate (23) for the bolts used to mount the assembly to a utility pole. Specifically, in order to insure reliable connection to utility pole (2), the pole mounting bolts (B) extending from pole (2) to receive the base (20) of the mounting assembly is preferably capped with locking means (e.g., a double nut, lock washer, cotter pin, etc.). As such, bolts (B) necessarily extend a relatively large distance beyond the surface of the vertical leg (22) of base (20). The extension of pole mounting bolts (B) often times interferes with the attachment and pivotal movement of coupling plate (23).

Installation of the mounting assembly shown in FIGS. 2a and 2b to utility pole (2) also tends to be cumbersome, since the mounting holes (21), positioned within the confines of vertical legs (27) and (28) of base (20), can be difficult to access. Moreover, assembly of vertical bolt (24) requires an additional step, especially since a nut or cotter pin is usually employed to retain bolt (24) within holes (25) and (26) formed through base (20).

SUMMARY OF THE INVENTION

It is an object of the present invention to provide a swivel base assembly for mounting an insulator to a support structure in an easy and efficient manner. In accordance with one embodiment of the present invention, a swivel base assembly is provided that includes a base member having a pair of opposed bearing seats spaced apart from one another in alignment along a bearing axis, and a one-piece coupling member having a first end received within the pair of opposed bearing seats and a second end adapted to be coupled to the insulator. The first end defines a first pivot axis for the insulator and the second end defines a second pivot axis for the insulator, wherein the first pivot axis is substantially coincident with the bearing axis and the second pivot axis is substantially perpendicular to the first pivot axis. The assembly also includes means for securing the base member to the support structure.

It is preferred that the base member include first and second half bearing members separable from one another, wherein the first half bearing member has one of the pair of bearing seats formed therein, and the second half bearing member has the other one of the pair of bearing seats formed therein. In this preferred embodiment, the means for securing includes at least one hole passing through each of the first and second half bearing members, and each hole intersects an extension of the bearing axis. More preferably, the holes passing through the half bearing members are spaced, along an extension of the bearing axis, a distance sufficient to prevent intersection between an imaginary cylindrical extension of each hole and any portion of the coupling member.

It is also preferred that the first half bearing member have a first mating surface, and the second half bearing member have a second mating surface. The mating surfaces are substantially complementary to allow the first and second half bearing members to engage one another to define the base member.

The use of a one-piece coupling member that functions to define both the longitudinal and vertical pivot axes allows for easier installation on a utility pole or tower. Moreover, by positioning the mounting holes in the base member in spaced relation to the zone in which the coupling member pivots the bolts extending from the utility pole do not interfere with the pivotal movement of the coupling member.

These and other objects of the present invention will be understood more clearly after reading the following description and appended drawings.

BRIEF DESCRIPTION OF THE DRAWING

For a fuller understanding of the nature and objects of the invention, reference should be made to the following detailed description of a preferred mode of practicing the invention, read in connection with the accompanying drawings, in which:

FIG. 2b is a side view of the mounting assembly shown in FIG. 2a;

FIG. 3 is a side view of the mounting assembly in accordance with the present invention;

FIGS. 4a and 4b are top and side views, respectively, of one of the half bearing base members shown in FIG. 3;

FIG. 5 is a top view of the half bearing base members assembled together;

FIGS. 6a and 6b are front and side views, respectively, of the coupling member shown in FIG. 3; and FIGS. 7a and 7b are front and side views, respectively, of a reinforced coupling member.

DETAILED DESCRIPTION OF THE INVENTION

Figure 1:
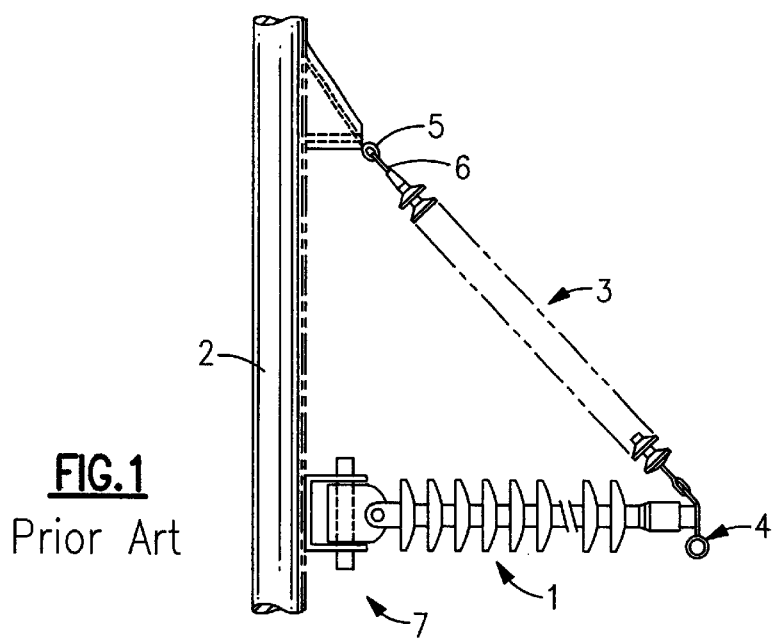
FIG. 1 is a side view of a horizontal-V insulator assembly for supporting power transmission lines.

FIG. 3 shows the mounting assembly (30) in accordance with one embodiment of the present invention arranged vertically as it would be mounted on a utility pole or tower. The assembly includes a first half bearing base member (31), a second half bearing base member (32), and a coupling member (33). The two half bearing base members have complementary mating surfaces that engage one another such that the members define two opposed, axially aligned bearing seats (34) and (35), respectively.

The coupling member (33) includes a bearing portion (33a) having a first end (33b) and a second end (33c) received within the first bearing seat (34) and the second bearing seat (35), respectively. The coupling member (33) also includes a connection portion (33d) extending from the mid-section of bearing portion (33a). A hole (36) passes through the thickness of coupling member (33). The clevis fitting (not shown) of an insulator (not shown) is connected to connection portion (33d) of coupling member (33) via a bolt (not shown) extending through hole (36) into the plane of FIG. 3.

The bearing seats define a first axis about which coupling member (33) (and thus the insulator connected thereto) can pivot in a longitudinal plane extending perpendicular to the plane of FIG. 3. The bolt (not shown) connecting the clevis fitting of the insulator to connection portion (33d) of coupling member (33) defines a second axis about which the insulator can pivot in a vertical plane coincident with the plane on which FIG. 3 is depicted.

Figure 2A:
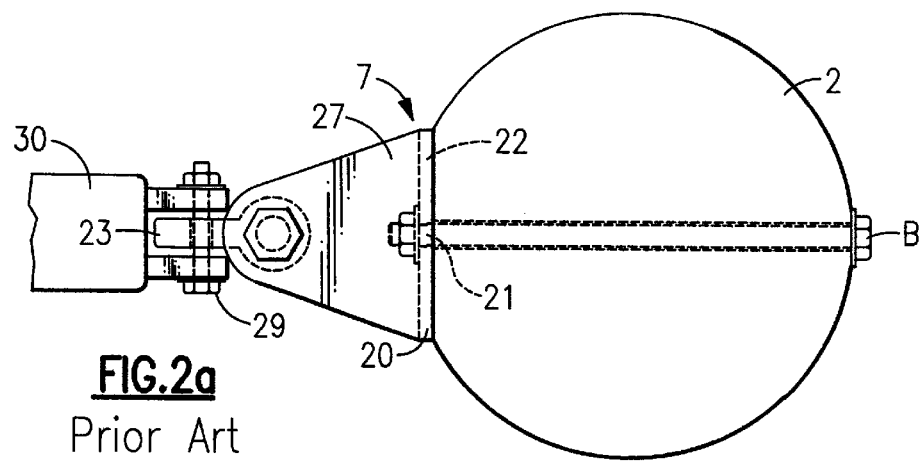
FIG. 2a is a top view of a mounting assembly used to connect strut insulators to a support structure.
Figure 2B:
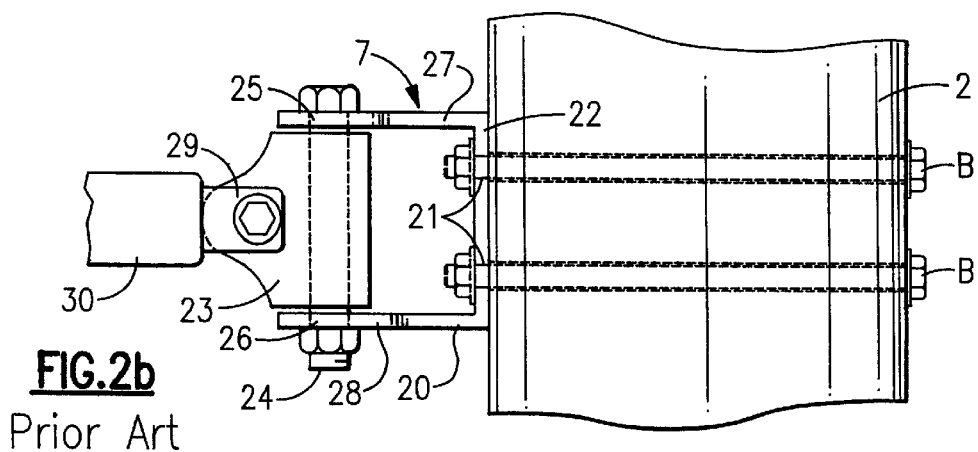

The use of a one-piece coupling member (33) that defines both the vertical and longitudinal planes in which the strut insulator will pivot to accommodate line movement allows for a simpler structure to install on a utility pole or tower. The installer need only assemble the two half bearing base members (31) and (32) around the bearing portion (33a) of coupling member (33) (explained in more detail below) and then secure the mounting assembly to the mounting bolts extending from the utility pole or tower. It no longer is necessary to first mount the base to the pole and then struggle with aligning the coupling plate and vertical bolt, as in the prior art mounting assembly shown in FIGS. 2a and 2b.

FIG. 3 also shows that each half bearing base member has mounting holes (37) and (38) formed therethrough, for receiving the mounting bolts extending from the utility pole or tower. The spacing between the mounting holes is greater than the width of coupling member (33). Additionally, the mounting holes are in spaced relation with respect to the longitudinal extension zone in which coupling member (33) pivots. These two features provide easy access to the pole mounting bolts and prevent interference of those bolts with the pivotal movement of coupling member (33) in the longitudinal plane described above.

Each component of the mounting assembly shown in FIG. 3 will now be described with reference to FIGS. 4a–6b.

FIGS. 4a and 4b are top and side views, respectively, of one of the half bearing base members (31), (32) shown in FIG. 3. The half bearing base member includes a main body (40) having a hole (37)1(38) formed therethrough from a front surface (40a) to a rear surface (40b) thereof. The hole (37)/(38) is adapted to receive a pole mounting bolt (not shown) extending from the utility pole or tower. A bearing seat (34)/(35) is formed in an inner side surface (40c) of main body (40). A planar base plate (41) extends from one-half of the juncture between rear surface (40b) and side surface (40c), and extends parallel to the axis BA of bearing seat (34)/(35). Base plate (41) includes a first elongate portion (41a) having a width approximately equal to one-half the width of main body (40). Base plate (41) also includes a second portion (41b) having a width approximately equal to, and a shape profile approximately the same as, that of main body (40).

The rear surface (40b) of main body (40) lies on the same plane as the upper surface of base plate (41). This allows second portion (41b) of half bearing base member (31) to fit beneath main body portion (40) of half bearing base member (32), and visa-versa, when the two members are assembled as shown in FIG. 5. Second portion (41b) also includes a hole (42) therethrough that is at least the same size as the hole (37)/(38). Hole (42) aligns with hole (37)/(38) when the two half bearing base members are assembled, also as shown in FIG. 5. The reason why first portion (41a) has a width half that of main body (40) becomes evident when the two half bearing base members are assembled, as shown in FIG. 5.

The interaction between hole (42) of first half bearing base member (31) and hole (38) of second half bearing base member (32), and hole (42) of second half bearing base member (32) and hole (37) of first half bearing base member (31) facilitates alignment of the axes of bearing seats (34)/(35) when the pole mounting bolts (B) extend through those holes to mount the bearing bases to a utility pole (2). This interaction also maintains alignment of the axes of bearing seats (34)/(35) under longitudinal loads applied to the mounting assembly as a result of longitudinal movement of the conductor supported by the insulator. The axis of bearing seat (34), for example, cannot shift out of alignment with the axis of bearing seat (35), because planar base plate (41) of first half bearing base member (31) effectively is fixed to main body (40) of second half bearing base member (32) through the above-described interaction.

The coupling member (33) of FIG. 3 is shown in detail in FIGS. 6a and 6b, the former being a front view and the latter being a side view. FIG. 6b shows that the first (33b) and second (33c) ends of bearing portion (33a) are round in cross-section, in order to provide a smooth surface to engage bearing seats (34), (35) in half bearing base members (31), (32), respectively.

FIGS. 7a and 7b show a reinforced coupling member (33) that is particularly suitable for short strut insulators. The critical buckling load of a strut insulator depends upon the length of the insulator. A shorter strut insulator has a higher critical buckling load than a longer strut insulator. Accordingly, when installing relatively short strut insulators, a higher strength coupling member is required. As shown in FIGS. 7a and 7b, the coupling member can include reinforcement ribs 33e on the front and rear faces of the thin portion of the coupling member, thereby effectively increasing the cross-sectional area of this portion of the coupling member. The reinforcement ribs do not extend to any portion of the bearing portion 33a, so that there is no interference with the longitudinal movement of the coupling member in the bearing base.

Installation of the mounting assembly to a utility pole or tower will now be explained.

The installer would first install the pole mounting bolts on the pole at a spacing equal to the spacing between holes (37), (38) of mounting assembly (30). This step can be omitted if the pole mounting bolts are already in place on the pole.

The installer would then insert the first end (33b) of bearing portion (33a) of coupling member (33) in the first bearing seat (34) of half bearing base member (31). The other half bearing base member (32) would then be assembled to the second end (33c) of bearing portion (33a), such that first (41a) and second (41b) portions of main body (40) of the two half bearing base members loosely interlock as shown in FIG. 5. FIG. 5 shows that sufficient clearance is provided between the mating surfaces of first (41a) and second (41b) portions of each half bearing base member so as to allow this assembly operation. The interlocked assembly maintains its assembled form until someone intentionally disassembles the two base from one another. Accordingly, the assembly of parts could be interlocked in advance of the actual mounting to a utility pole.

Once this simple assembly operation is completed, the installer can slide the mounting assembly over the pole mounting bolts and lock the assembly in place using appropriate locking mean (e.g., double nuts). The mounting assembly is now ready for connection to the strut insulator. It is not necessary to first connect a coupling plate to the mounting assembly as in the prior art.

The mounting assembly of the present invention provides a significant improvement over the mounting assemblies currently available, in that it has fewer hard-to-handle components (e.g., the vertical bolt/cotter key assembly shown in FIGS. 2a–2b), can be secured to a utility pole as a complete assembly, allows easy access to the locking means (e.g., double nuts) used on the pole mounting bolts, and allows free movement of the coupling member without interference from the pole mounting bolts.

While the present invention has been particularly shown and described with reference to the preferred mode as illustrated in the drawing, it will be understood by one skilled in the art that various changes in detail may be effected therein without departing from the spirit and scope of the invention as defined by the claims appended hereto.

What is claimed is:

1. A mounting assembly for connecting an insulator to a support structure comprising:

a base member having a pair of opposed bearing seats spaced apart from one another in alignment along a bearing axis;

a one-piece coupling member having a first end received within said pair of opposed bearing seats and a second end adapted to be coupled to the insulator, said first end defining a first pivot axis for the insulator and said second end defining a second pivot axis for the insulator, said first pivot axis being substantially coincident with said bearing axis and said second pivot axis being substantially perpendicular to said first pivot axis; and means for securing said base member to the support structure, wherein said means for securing comprises at least one hole passing through said base member and having an axis that intersects an extension of said bearing axis at a position outside said first end of said one-piece coupling member.

2. The mounting assembly of claim 1, wherein said base member comprises first and second half bearing members separable from one another, said first half bearing member having one of said pair of bearing seats formed therein, and said second half bearing member having the other one of said pair of bearing seats formed therein.

3. The mounting assembly of claim 2, wherein said means for securing said base member to the support comprises at least one hole passing through each of said first and second half bearing members, wherein each hole intersects an extension of said bearing axis.

4. The mounting assembly of claim 2, wherein said first half bearing member has a first mating surface, said second half bearing member has a second mating surface, and said mating surfaces are substantially complementary to allow said first and second half bearing members to engage one another to define said base member.

5. The mounting assembly of claim 4, wherein said first mating surface includes a hole passing therethrough and said second mating surface includes a hole passing therethrough, and said holes are aligned to facilitate alignment of said opposed bearing seats along said bearing axis.

6. The mounting assembly of claim 1, wherein said first end of said coupling member comprises an elongate member defining said first pivot axis, and having opposed end portions received within said pair of opposed bearing seats, respectively.

7. The mounting assembly of claim 6, wherein said second end has a hole passing therethrough and the axis of said hole is substantially coincident with said second pivot axis.

8. The mounting assembly of claim 1, wherein the axis of said at least one hole is substantially perpendicular to an extension of said bearing axis.

9. The mounting assembly of claim 8, wherein said at least one hole is spaced, along an extension of said bearing axis, a distance sufficient to prevent intersection between an imaginary extension of said at least one hole and any portion of said coupling member.

10. A swivel base assembly for connecting a strut insulator to a vertical support structure, comprising:

a bearing base member comprising a first half bearing member having a first bearing seat formed therein and a second half bearing member having a second bearing seat formed therein, said first half bearing member being engageable with said second half bearing member such that the first and second bearing seats are spaced apart from one another in alignment along a bearing axis;

a one-piece coupling member comprising a bearing portion having first and second end portions pivotally fixed within said first and second bearing seats, respectively, and further comprising a connection member extending from a middle region of said bearing portion; and means for securing said bearing base member to the vertical support structure.

11. The swivel base assembly of claim 10, wherein a distal end portion of said connection member has a hole passing therethrough in a direction substantially perpendicular to said bearing axis.

12. A mounting assembly for connecting an insulator to a support structure, comprising:

a base member having a pair of opposed bearing seats spaced apart from one another in alignment along a bearing axis, said basis member comprising first and second half bearing members separable from one another, said first half bearing member having one of said pair of bearing seats formed therein, and said second half bearing member having the other one of said pair of bearing formed therein;

a one-piece coupling member having a first end received within said pair of opposed bearing seats and a second end adapted to be coupled to the insulator, said first end defining a first pivot axis for the insulator and said second end defining a second pivot axis for the insulator, said first pivot axis being substantially coincident with said bearing axis and said second pivot axis being substantially perpendicular to said first pivot axis; and means for securing said base member to the support structure.

13. The mounting assembly of claim 12, wherein said means for securing comprises at least one hole passing through said base member and intersecting an extension of said bearing axis.

14. The mounting assembly of claim 13, wherein the axis of said at least one hole is substantially perpendicular to an extension of said bearing axis.

15. The mounting assembly of claim 14, wherein said at least one hole is spaced, along an extension of said bearing axis, a distance sufficient to prevent intersection between an imaginary extension of said at least one hole and any portion of said coupling member.

16. The mounting assembly of claim 12, wherein said means for securing comprises at least one hole passing through each of said first and second half bearing members, wherein each hole intersects an extension of said bearing axis.

17. The mounting assembly of claim 12, wherein said first half bearing member has a first mating surface, said second half bearing member has a second mating surface, and said mating surfaces are substantially complementary to allow said first and second half bearing members to engage one another to define said base member.

18. The mounting assembly of claim 17, wherein said first mating surface includes a hole passing therethrough and said second mating surface includes a hole passing therethrough, and said holes are aligned to facilitate alignment of said opposed bearing seats along said bearing axis.

19. The mounting assembly of claim 12, wherein said first end of said coupling member comprises an elongate member defining said first pivot axis, and having opposed end portions received within said pair of opposed bearing seats, respectively.

20. The mounting assembly of claim 19, wherein said second end has a hole passing therethrough and the axis of said hole is substantially coincident with said second pivot axis.

* * * * *